United States Patent [19]

Andes

[11] Patent Number: 4,865,572
[45] Date of Patent: Sep. 12, 1989

[54] SUPPORT SEAT FOR A SKI

[76] Inventor: Royce C. Andes, 2704 Highway 99, Biggs, Calif. 95917

[21] Appl. No.: 303,934

[22] Filed: Jan. 30, 1989

[51] Int. Cl.⁴ .............................................. A63C 15/00
[52] U.S. Cl. ..................................... 441/72; 280/14.1; 280/28.14
[58] Field of Search ...................... 441/65, 68, 72, 73; 280/14.1, 28.14; 434/253

[56] References Cited

U.S. PATENT DOCUMENTS

| | | | |
|---|---|---|---|
| 3,145,399 | 10/1962 | Jackson | 441/72 |
| 3,336,038 | 8/1967 | Cohen | 441/72 |
| 4,629,434 | 12/1986 | Monreal | 441/72 |
| 4,632,408 | 12/1986 | Olpp et al. | 280/28.14 |

FOREIGN PATENT DOCUMENTS 145470 4/1936 Austria ............................... 280/14.1
2611515 9/1988 France ............................... 280/14.1

Primary Examiner—Joseph F. Peters, Jr.
Assistant Examiner—Jesûs D. Sotelo

[57] ABSTRACT

A seat affixed to an extra wide ski for use primarily by paraplegics for the sport of water skiing. The seat is comprised of a tubular framework with a fabric sling-type seat which supports the rider in a forward angled seated position with the knees drawn up towards the chest. Padded front and side rails prevent forward and lateral movement of the rider's buttocks. Frictional fit of the rider's buttocks between the padded side rails and placement of the knees and legs over the front rail secure the rider in position without the use of belts or straps. The tubular framework is affixed to a base which is connected to the central top surface of the sky by bolts. Foot bindings are affixed to the forward top surface of the ski to removably retain the rider's feet.

14 Claims, 5 Drawing Sheets

SUPPORT SEAT FOR A SKI

BACKGROUND OF THE INVENTION

1. Field of the Invention:

This invention relates to ski equipment in general and more precisely to a support seat attachable to a large single ski. Although the invention is designed primarily for handicapped people, it can also be used by the general public.

2. Description of the Past Art:

People who enjoy water sports but are paraplegics are not able to participate in water skiing due to their physical limitations and the availability of suitable equipment. Attempts to provide water ski equipment useful for the paraplegic have been tried with some limited successes. There is very little suitable water skiing equipment available for the person with limited mobility of their lower extremities.

In a past art patent search conducted to examine water ski devices safely useful for paraplegics, no ski devices examined appeared easily applicable to a person having partial or complete loss of lower extremity mobility. The Monreal device, Pat. No. 4,629,434, dated Dec., 16, 1986, discloses a widened knee board with attached seat and knee and foot bracing. The seat could not be used by a paraplegic since bracing by the legs would be required to support the body. Even in a squatting position, some strength would be required in the legs to merely maintain the kneeling position and support the upper body. The Monreal device also requires some mobility of the lower legs or hip area for maneuvering the board while skiing. Unless the handicapped user had help, he would have extreme difficulty in even getting on the device in the first place.

The Jackson device, Pat. No. 3,145,399, dated Aug. 25, 1964, describes a water ski/toboggan device which may be used by a "semi-paralyzed or otherwise handicapped person". The seat disclosed in the Jackson device however, does not provide any means for side support. It appears that a handicapped person getting on the device would probably require assistance.

The remaining past art devices examined were indicative of the art, and comprised a single enlarged water ski with attached seat, some with handles or steering wheels. All seats disclosed in these devices fail to provide any means of side bracing or support to secure a paraplegic in a stable lateral position. Being unsecured to the seat or ski also makes maneuverability difficult, as independent movement of the rider will more than likely cause an imbalance and a fall. The design of the past art seats encourage an upright position of the rider which requires the use of the legs to maintain that position. The higher the placement of the center of body weight above the surface of the ski also tends to create an imbalance and an increased tendency to overturn. This would prove only to aggravate the paraplegics already compromised situation of poor balance. As with the Monreal and the Jackson device, the handicapped user would require a great deal of assistance to use each of the past art devices. There would also be a tendency due to the upright position of the seated rider to be pulled forward off the seat during take off. Applying straps to the seats would provide a potential danger from drowning should the rider and ski overturn.

SUMMARY OF THE INVENTION

My invention provides special seating apparatus for a skier. Although my seating apparatus can be used by anyone, it is particularly designed for the handicap user who has limited or complete loss of the use of his lower extremities. The invention is structured for attachment to the upper surface of an extra wide single ski. Although the seat is primarily directed towards use on water skis, it can also be used on "snow board" type snow skis. The seating apparatus is designed to support the user without requiring the aid of his legs for bracing. Longitudinal padded rails on each side of the sling-type seat firmly secures the person from side to side movement. A transverse padded front rail helps to support the users knees and upper legs in an upward position. The frame structure formed by the two side rails and the transverse front rail provide a narrowed railed area in the front and above the seating area of the invention where the rider is tightly wedged, causing sufficient resistance to prevent him from inadvertently falling off the seat while skiing. The thick resilient padding on the two side rail provides a degree of adjustability of the space between the two rails due to the high degree of compressibility of the padding, thus allowing various sized riders to fit snugly between the two rails. The rider's legs are extended out in front of the seat with the knees resting on the transverse rail and the feet releasably secured in a foot binding.

When skiing, the user leans the upper body forward over his thighs, maintaining a low center of balance. My seating apparatus allows extreme maneuverability since the rider is securely seated within the device, and leaning movements therefore are more easily transferred to the ski.

The invention is particularly useful in that the user can normally get onto the device without assistance from others. This is especially true once both he and the ski are in the water. The ski portion of this device is easily submerged beneath the water with the upper padded seat apparatus floating on the surface. The user, wearing a life jacket, can easily float over the top of the seat and secure himself in place while pushing down on the seat apparatus. The foot binding used with the invention is also within easy reach of the user for placement of his feet. The opening of the upper framework above the sling-type seat is sized slightly smaller than the width of the person's buttocks to provide a snug fit against the padded rails. The user then holds the end of the rope in his hands, as with conventional water skiing, and is pulled along behind the boat. Side to side maneuvering, as with conventional skiing, is possible by the user leaning to the right or to the left.

Although the seat apparatus is designed to hold the rider securely, especially when being pulled in a forward direction, the rider can escape out the back of the ski seat easily if a spill occurs. A backward push from the seat easily releases the rider who is then supported in the water by his life jacket.

Two sizes of skis are normally used with my seating apparatus. One is for beginners. A second is for advanced racing or trick skiing enthusiasts with both skis being available from existing manufacturers. Skis selected for seat attachment for beginners are wider for stability than those for racing which are more maneuverable.

In the preferred embodiment of the invention, accommodations for user size are possible with vertical height adjustments in the transverse front rail which supports the knees. This adjustment increases or decreases the relative leg length or distance between the seat and the foot bindings.

Therefore, it is a primary object of my invention to provide a seat for a ski, primarily water skis, which can be used by certain groups of handicapped as well as able bodied people.

A further object of my invention is to provide a seat for a water ski which can be used by the handicapped without assistance from others once both are in the water.

An even further object of my invention is to provide a seat for a water ski which releasably secures the rider to the device without securing straps.

A still further object of the invention is provide a seating apparatus for a water ski with the invention also being suitable for use on "snow board" type snow skis.

Further objects and advantages of my invention will become apparent by reading descriptions of the numbered parts in the following specification and comparison with similarly numbered parts shown in the drawings.

DESCRIPTION OF THE PREFERRED EMBODIMENT

Figure 1:
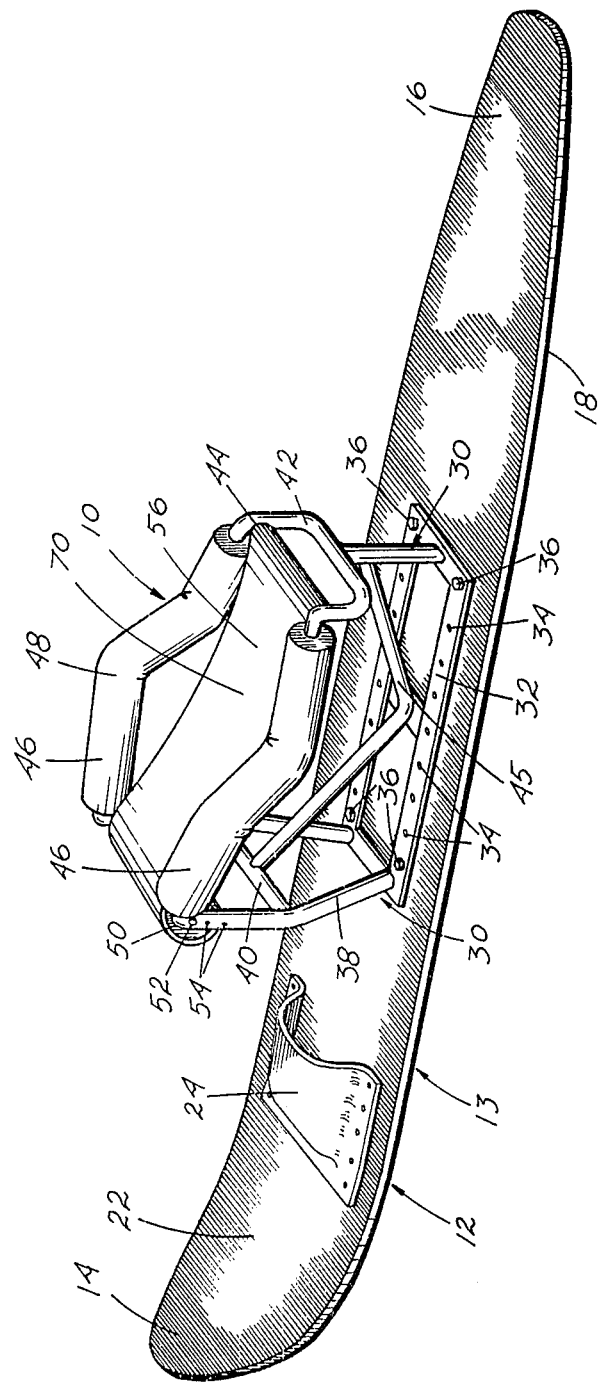
FIG. 1 is an assembled perspective view of the preferred embodiment attached to the upper surface of a single "snow board" type ski.
Figure 2:
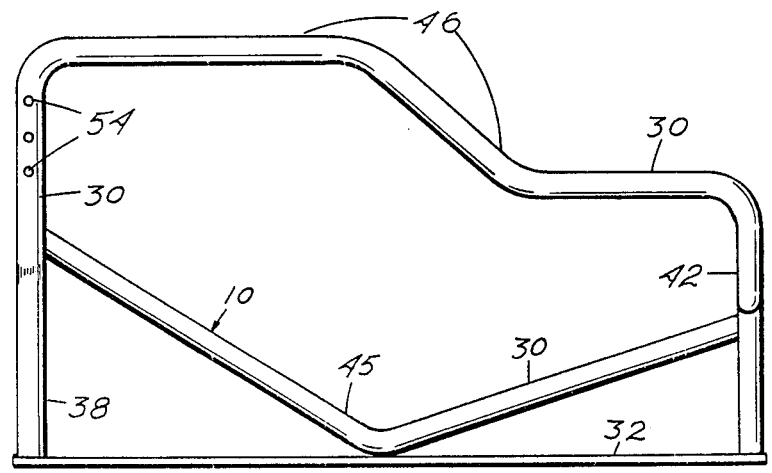
FIG. 2 is a side view of the tubular seat framework without padding or a seating surface attached.
Figure 9:
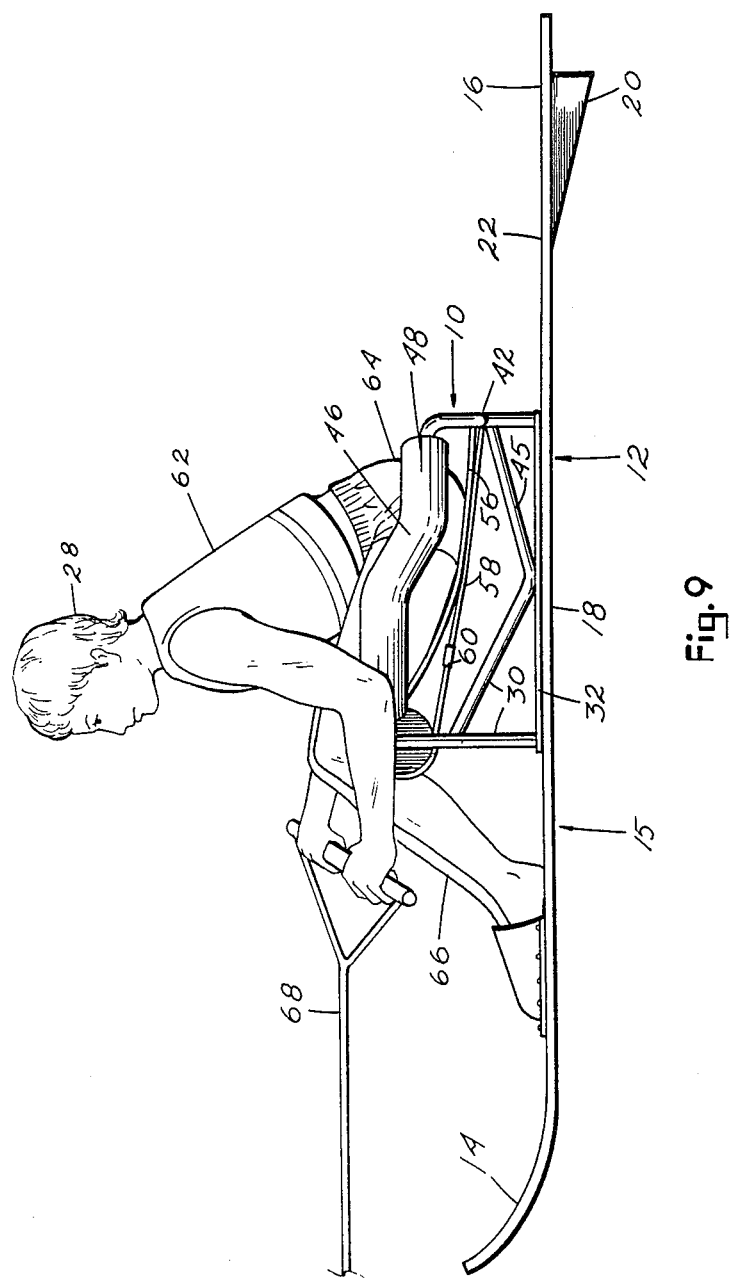
FIG. 9 is a left side view of the assembled invention in use attached to the top surface of a water ski.

Referring now to the drawings in general and to the illustration of the preferred embodiment assembled and attached to the top surface of an enlarged single snow ski 13 in FIG. 1, and water ski 15 in FIG. 9. The preferred embodiment, designated seat apparatus 10, is attached to the top surface 22 of a ski 12, the designated for skis in general. Although ski 12 is basically an enlarged single widened ski, seat apparatus 10 could conceivably be useful attached to two closely positioned parallel regular sized skis 12. In the illustration at FIG. 1, snow board types snow ski 13 is depicted as an elongated planar panel with narrow sides edges and an upturned rounded front end or tip 14 and a tapering, narrow rounded back end or tail 16. Water ski 15 shown in FIG. 9 is of the same basic construction as snow ski 13 with addition of fin 20 to the bottom surface 18 of tail 16. Ski 12 used for the invention, normally ranges in widths of eight to eighteen inches and lengths of five to six feet, depending on the maneuverability desired by the person. Ski 12 is available as a pre-manufactured item on the open market and no inventive claim is made to any ski 12 in this disclosure. Top surface 22 of ski 12, adjacent tip 14, is affixed with foot binding 24. Foot binding 24 consists of a cup shaped resilient material designed to releasably retain the front area of both feet 26 of user 28. The peripheral edges of the front and two lateral sides of foot binding 24 are attached by bolting, adhesive, or clamping means to top surface 22 of ski 12, leaving an opened rear edge for placement of feet 26. Although the use of foot binding 24 is highly recommended in combination with seat apparatus 10, its use is not absolutely essential since the structure of seat apparatus 10 has a tendency to hold the knees and thus the feet of a user 28 together.

Seat apparatus 10 is affixed approximately midsection to top surface 22 of ski 12 by a frame base 32 with the front of seat apparatus 10 toward the front of the ski 12, and the back or rear of apparatus 10 toward the back of ski 12. Frame base 32 consists of two parallel elongated flat plates connected by three transverse, equally spaced plates of snorter length. The two parallel elongated plates are oriented longitudinally on top surface 22 and contain a multiple of bolt apertures 34. Frame base 32 is normally affixed to ski 12 by at least four bolts 36.

A tubular frame 30 is permanently affixed to the top surface of frame base 32. Two upwardly extending, somewhat outwardly angled front support legs 38 are affixed at the front end of seat structure, one each to the front corners of frame base 32. Approximately two thirds the distance up from the bottom of both front support legs 38, an inward angle develops. This results in the top portion of both front support legs 38 forming two parallel vertical sections. Both front support legs 38 are connected by one horizontal front brace 40 for additional strength. Y-shaped rear support leg 42 at the rear of the seating structure consists of one Y-shaped structure affixed centrally to the rear of frame base 32. One longitudinal V-shaped center brace 45 is affixed on one end to the center of front brace 40, angles downward and attaches to the center transverse plate of frame base 32, and angles upwards and attaches on the opposite end to the Y junction of Y-shaped rear support leg 42. The upper ends of Y-shaped rear support leg 42 contain a connecting horizontal rear brace 44 which runs parallel with front brace 40. The upper ends of Y-shaped rear support leg 42 connect with the upper ends of both front support legs 38 by two generally parallel lengthwise side framing members designated side rails 46. Each of the side rails 46 are covered with a resilient closed-celled foam padding 48 which cushions and protects user 28 from injury, and also serves as a buoyancy means for supporting the preferred embodiment in the water. Each side rail 46 extends off from the top distal ends of each front support leg forming several angles before attachment with each distal upper end of Y-shaped rear support leg 42. The reward section of each side rail projects slightly outward horizontally; the midsection angles downward and inward and the front section is substantially horizontal and continues to angle inward at a slightly sharper angle than the midsection toward of the front seat apparatus 10. Side rails 46 extend in a generally parallel alignment with two side edges of sling seat 56 and are positioned sufficiently higher than the primary load bearing surface 70 of sling seat 56 to render lateral support against the buttocks of user 28.

Figure 5:
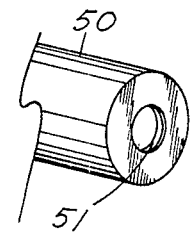
FIG. 5 is an enlarged perspective partial end view of the frontal knee rest and sling seat attachment bar showing a threaded aperture for receiving a mounting bolt.

An additional horizontal framing member, front seat attachment bar 50, which serves as sling seat 56 attachment member and as a knee and upper leg rest is affixed transversely of side rails 46 to the upper ends of front support legs 38 in parallel alignment with front brace 40. Front seat attachment bar 50, also covered with resilient padding 48, is removably retained between each front support leg 38 by adjustment bolts 52. Adjustment bolts 52 are sized to be threadably inserted into threaded apertures 51 located on the distal ends of front seat attachment bar 50, shown in FIG.5. Adjustment bolts 52 pass through adjustment apertures 54, three of which are located on each upper section of front support leg 38, shown in FIG. 3. Variations for leg 66 length can be accomplished with the adjustment of front seat attachment bar 50. Lowering front seat attachment bar 50 helps to accommodate shorter lengths of legs 66. In a slight variation of the preferred embodiment of the invention, front seat attachment bar 50 is affixed in a nonadjustable manner.

Figure 3:
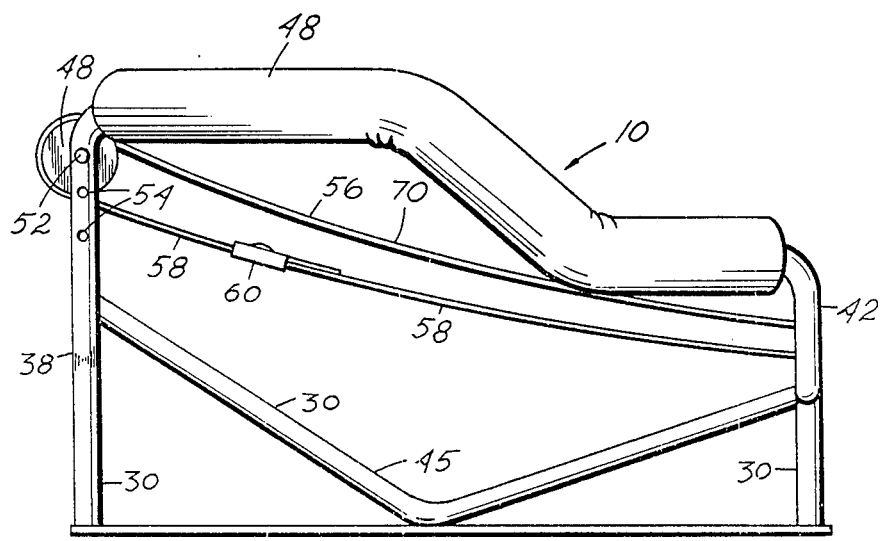
FIG. 3 is a side view of the tubular seat framework with padding and the seating surface attached.
Figure 4:
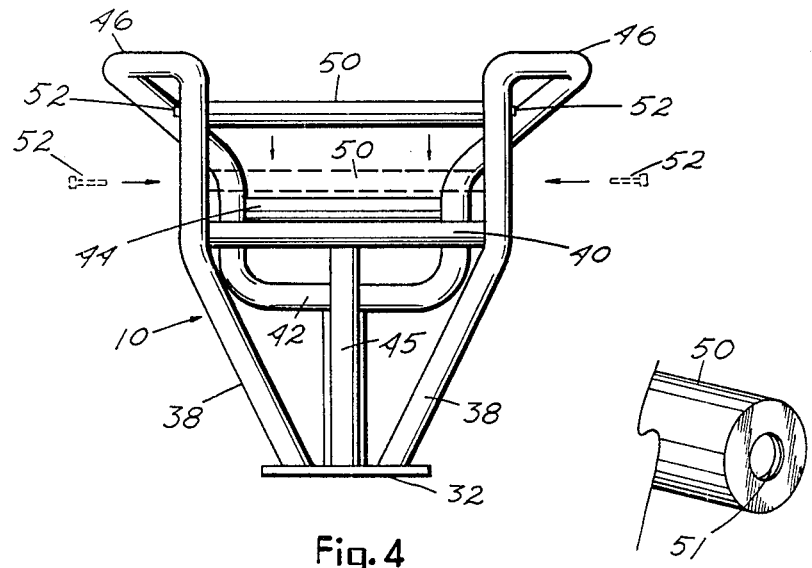
FIG. 4 is a frontal view of the tubular seat framework without padding. The dotted outline represent the vertical adjustability of the frontal knee rest and sling seat attachment bar.
Figure 6:
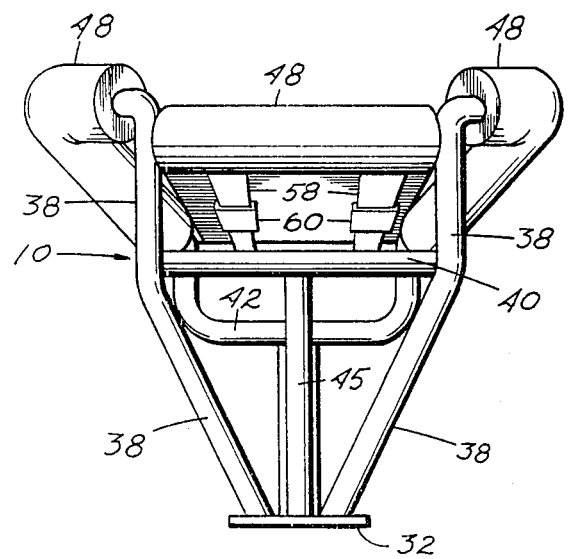
FIG. 6 is a frontal view of the tubular framework with the padding and seating surface or sling attached.
Figure 7:
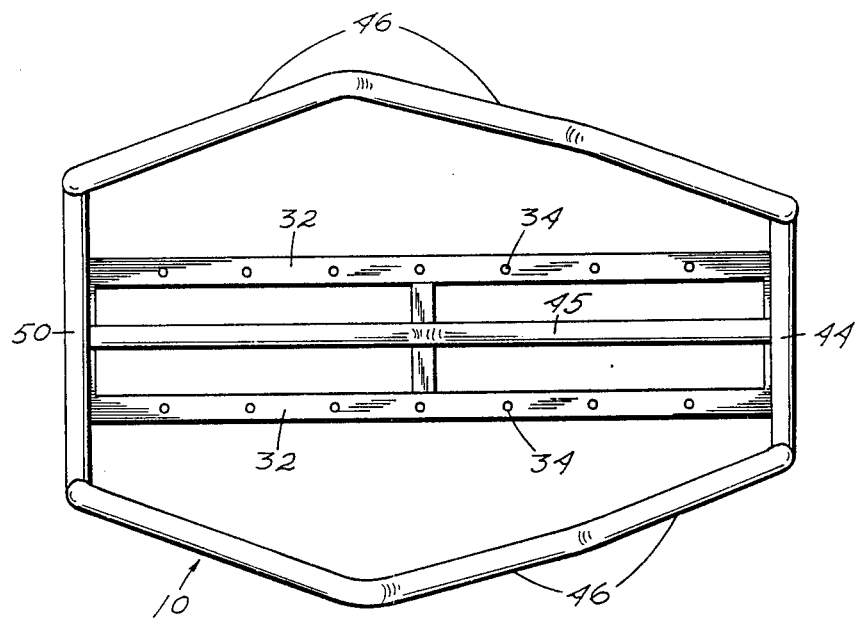
FIG. 7 is a top plan view of the tubular framework without padding. Also shown is the base with a plurality of apertures to allow bolting of the base to the top of a ski.
Figure 8:
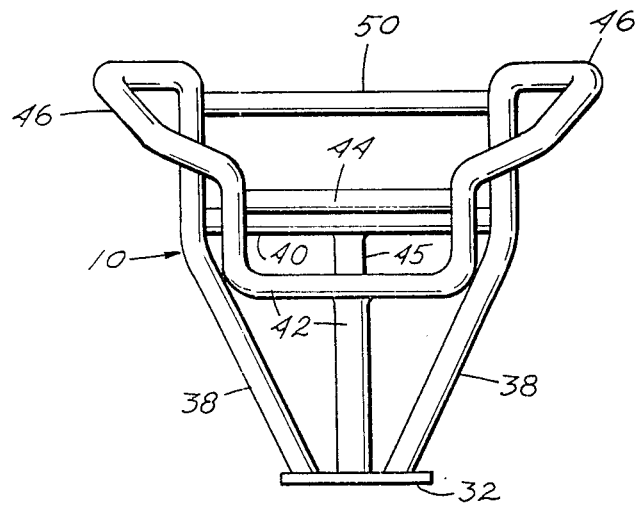
FIG. 8 is a rear view of the tubular framework without the padding or the seat attached.

Sling seat 56 serves as the seating surface of seat apparatus 10. Primary load bearing surface 70 is the area of sling seat 56 for the buttocks of user 28 to sit on between side rail 46. Front seat attachment bar 50 is positioned upward and at the front of primary load bearing area 70 of sling seat 56 and provides the upper leg 66 and knee rest for seated human user 28. Sling seat 56 consists of a rectangular section of canvas or fabric having two lengthwise side edges extending from the front to the back of apparatus 10, generally in parallel with side rails 46. Sling seat 56 is attached to seat apparatus by two belts 58. One attachment belt 58 is affixed to the right upper and lower corners of sling seat 56, while a second attachment belt 58 is affixed to the left corners. Each attachment belt 58 is affixed with one buckle 60 for adjustment and removal of sling seat 56. With buckles 60 unlatched and belts 58 separated, the forward edge of sling seat 56 is placed over front seat attachment bar 50 and the rear edge placed over rear brace 44, which is also covered with padding 48 Belts 58 are then drawn underneath sling seat 56 and connected with buckles 60. Increasing the tension on belt 58 elevates sling seat 56 higher above ski 12. Belts 58 are best shown in FIG. 3, 6, and 9.

When utilized for water skiing, the device is placed in the water along with user 28. User 28, wearing life jacket 62, floats over the partially submerged tip 14 of water ski 15 and backs into sling seat 56. Water ski 15 will remain buoyant due to foam padding 48. User 28 sits directly on sling seat 56 on primary load bearing surface 70 and with buttocks 64 fitting snugly between side rails 46. Legs 66 of user 28 are positioned over front seat-attachment bar 50 and extend down to top surface 22 of water ski 15. Feet 26 are then easily positioned into foot binding 24 by the hands of user 28. User 28 is now submerged up to the chest area while seated on the device. User 28 holds ski rope 68 in his hands and positions tip 14 slightly above the surface of the water prior to take off. Bottom surface 18 of water ski 15 planes on the surface of the water with tip 14 positioned slightly above the water's surface and tail 16 slightly submerged, depending on the speed and weight of user 28. User 28 can maneuver much the same way as with conventional water skiing where leaning to one side causes movement in the respective direction. Since user 28 is securely seated in sling seat 56, with side rails 46 preventing side to side displacement, user's hands are left free to manage ski rope 68. The unique design of seat apparatus 10 retains user 28 while being pulled in a forward direction by the boat. When user 28 is first getting into position on seat apparatus 10, buttocks 64 is positioned over the widest area between side rails 46 and then lowered onto the surface of sling seat 56. A slight forward movement of buttocks 64 engages them and the sides of the upper legs against front seat attachment bar 50 and the inwardly angled front sections of side rails 46 with the majority of the buttocks 64 of user 28 resting below and rearward on primary load bearing surface 70 of sling seat 56. As user 28 leans forward, being pulled by ski rope 68, the forward pull helps to further wedge buttocks 64 against side rails 46 and front seat attachment bar 50 causing increased resistance to falling out of the seat. Should the device overturn and user 28 inadvertently fall during skiing, the backward force of a spill will safely disengage user 28 from seat apparatus 10. The device will continue to float due to buoyant padding 48, as will user 28 due to life jacket 62. Engagement of feet 26 within foot binding 24 is not so secure as to cause injury to feet 26 during a fall. Feet 26 are also prevented from pushing through foot binding 24, as with strap type devices, and becoming caught, causing injury during those falls.

When utilized for snow skiing, many of the same principals apply as with water skiing. Snow ski 13 an user 28 must be transported to the top of hill to be skied, necessarily with assistance. Snow ski 13 is placed on the surface of the snow at the top of the hill where user 28 manipulates himself, with or without help, onto sling seat 56. User 28 can push off and maneuver with the assistance of his arms or short ski poles can be provided. Maneuverability is accomplished with basically the same leaning motion as in conventional snow skiing. If user 28 falls while snow skiing, he can right himself and continue unassisted.

Modifications in design are anticipated in the preferred embodiment. Seat apparatus 10 could be molded of plastic or fiberglass in either a one-piece unit or several assembled parts which could effectively replace the metal tubular frame 30 and fabric sling seat 56. Therefore, those skilled in the art will recognize that various alterations can be made in the invention and still accomplish the same objective. Therefore, the descriptions and drawings are merely illustrative of the invention and are not intended to limit the scope of the appended claims.

What I claim as my invention is:

1. A seat apparatus for a human to use on a ski, said seat apparatus comprising in combination, a base having means for attachment to a top surface of said ski; said base forming support structure for a framework affixed to said base extending from said base forming an elevated support structure for a seating surface above said base;

said framework including at least two side framing members one adjacent each of two side edges of said seating surface, said two side framing members generally extending from a front end to a back end of said framework, a front end of each said side framing member angling inward, said two side framing members sufficiently upward of said seating surface to render lateral support against said human's buttocks when sitting on said seating surface between said two side framing members;

at least one frontal framing member affixed at said front end of said framework transversely of said angled front ends of said two side framing members, said frontal framing member positioned upward at a front of a primary load bearing area of said seating surface providing an upper leg and knee rest for said seated human;

said frontal framing member with said two angled front ends of said two side framing members forming a sufficiently narrowed frame structure at said front of said primary load bearing area of said seating surface to cause sufficient wedging and resistance of said seated human to prohibit said human from inadvertently falling off said seat apparatus while skiing.

2. The seat apparatus of claim 1 wherein said base is formed of two flat substantially rectangular elongated parallel panels connected endwardly and centrally together by crosswise panels.

3. The seat apparatus of claim 1 wherein said means for attachment of said base to said ski is a plurality of bolt apertures in said base for bolting said base to said top surface of said ski.

4. The seat apparatus of claim 1 wherein said framework is made of tubing.

5. The seat apparatus of claim 1 wherein said seating surface is a flexible fabric panel.

6. The seat apparatus of claim 1 wherein said two side framing members and said frontal framing member are covered with an outer covering of resilient padding.

7. A seat apparatus for a human to use on a ski, said seat apparatus comprising in combination,
a base having means for attachment to a top surface of said ski; said base forming support structure for
a framework affixed to said base extending from said base forming an elevated support structure for
a seating surface above said base;
said framework including at least two side framing members one adjacent each of two side edges of said seating surface, said two side framing members generally extending from a front end to a back end of said framework, a front end of each said side framing member angling inward, said two side framing members sufficiently upward of said seating surface to render lateral support against said human's buttocks when sitting on said seating surface between said two side framing members;
at least one frontal framing member affixed by adjustable attachment means at said front end of said framework transversely of said angled front ends of said two side framing members, said frontal framing member positioned upward at a front of a primary load bearing area of said seating surface providing an upper leg and knee rest for said seated human;
said frontal framing member with said two angled front ends of said two side framing members forming a sufficiently narrowed frame structure at said front of said primary load bearing area of said seating surface to cause sufficient wedging and resistance of said seated human to prohibit said human from inadvertently falling off said seat apparatus while skiing.

8. The seat apparatus of claim 7 wherein said base is formed of two flat substantially rectangular elongated parallel panels connected endwardly and centrally together by crosswise panels.

9. The seat apparatus of claim 7 wherein said means for attachment of said base to said ski is a plurality of bolt apertures in said base for bolting said base to said top surface of said ski.

10. The seat apparatus of claim 7 wherein said framework is made of tubing.

11. The seat apparatus of claim 7 wherein said seating surface is a flexible fabric panel.

12. The seat apparatus of claim 7 wherein said two side framing members and said frontal framing member are covered with an outer covering of resilient padding.

13. The seat apparatus of claim 7 with said frontal framing member affixed by adjustable attachment means at said front end of said framework wherein said attachment means is provided by a plurality aligned bolt apertures in said framework for bolting said frontal framing member thereto.

14. A seat apparatus for a human to use on a ski, said seat apparatus comprising in combination,
a base having means for attachment to a top surface of said ski; said base affixed to
a support structure extending from said base providing support for
at least two side rails one adjacent each of two sides of a primary load bearing surface of a seating surface, said two side rails extending generally from a front end to a back end of said support structure, said two side rails sufficiently upward of said seating surface to render lateral support against said human's buttocks when sitting on said seating surface between said two side rails;
at least one frontal member affixed transversely of said two side rails to said support structure, said frontal member positioned upward at a front of said primary load bearing area of said seating surface providing an upper leg and knee rest for said seated human;
said frontal member with said two side rails forming a sufficiently narrowed structure at said front and said sides of said primary load bearing area of said seating surface to cause sufficient wedging and resistance of said seated human to prohibit said human from inadvertently falling off said seat apparatus while skiing.

* * * * *